UNITED STATES PATENT OFFICE.

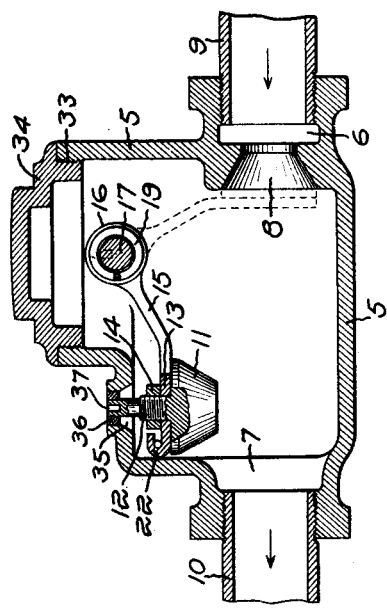

JAMES F. MOYNIHAN, OF WEST NEWTON, MASSACHUSETTS.

VALVE.

1,110,269.

Specification of Letters Patent.

Patented Sept. 8, 1914.

Application filed May 31, 1913. Serial No. 770,885.

*To all whom it may concern:*

Be it known that I, JAMES F. MOYNIHAN, a citizen of the United States, and a resident of West Newton, in the county of Middlesex and State of Massachusetts, have invented an Improvement in Valves, of which the following description, in connection with the accompanying drawings, is a specification, like characters on the drawings representing like parts.

This invention relates to valves, and more especially, though not exclusively, to automatic shut-off valves for gas, gasolene, or other supply pipes, which it is desirable to shut off in case of fire.

My invention will be best understood by reference to the following specification, when taken in connection with the accompanying drawings of one specific embodiment thereof, while its scope will be more particularly pointed out in the appended claims.

In the drawings:

Figure 1 is a side elevation, partly in section, of a shut-off valve embodying my invention; Fig. 2 is a central, longitudinal, sectional view of the same; Fig. 3 is a plan section on line 3—3 of Fig. 1; and Fig. 4 is a sectional view on line 4—4 of Fig. 1.

Referring to the drawings, and to the embodiment of my invention which I have selected for illustrative purposes, I have there shown a valve comprising a valve casing 5, having an inlet 6, an outlet 7, and a valve seating 8 therebetween. The inlet 6 is intended to be connected in practice by a suitable pipe 9 to the source of supply of gas, gasolene, or other inflammable fluid, while the outlet 7 is intended to be connected in practice by a suitable pipe 10 to the supply pipes of the building. Where the valve is used in connection with a gas supply system, the pipe 10 will lead to the meter, so that the latter, as well as the piping of the building, will be shut off from the source of supply.

While I may employ any other suitable form of valve, I prefer to use a valve 11 in the form of a tapered plug, and a valve seat of corresponding shape, in order that the valve may be self-centering and have a large seating area. The valve 11 may be mounted in any other suitable manner, but herein is provided with a threaded stem 12 passing through and secured to a yoke 13, by means of a nut 14, while the yoke is herein provided with a pair of arms 15 having collars 16 encircling a spindle, or shaft, 17. While the latter may be mounted to turn, I prefer to make it fixed, and allow the collars 16 to turn thereon. In a device of this character, one of the principal requisites is that corrosion of the metal parts shall not cause them to stick and render the device inoperative in case of fire. I have, therefore, arranged the collars 16 so that they have a certain amount of free play axially, and have constructed and arranged them so that they will turn with great freedom upon the spindle 17. In the present instance, in order to accomplish this free turning of the collars upon the spindle, I have reduced the bearing surface of the collars upon the spindle by countersinking each collar from both sides, to provide a knife edge 18 contacting with the spindle.

Encircling the spindle 17 is a helically coiled torsional spring 19, having its terminal portions secured respectively to the yoke and spindle, the spring being wound in such a direction as to tend normally to move the valve toward its seat. While the spring may be secured to the yoke and spindle in any other suitable manner, in the present instance, it is provided with an arm 20, having a terminal portion 21 bent parallel to the spindle, and secured to the yoke in any appropriate manner, as by means of an ear 22. The other end of the spring may be secured to the spindle in any suitable manner, but herein is provided with a terminal portion 23, bent inwardly and engaging a longitudinal slot 24 provided in the spindle. This slot has its entrance at one end of the spindle, so that the latter may be freely withdrawn from its place without disturbing the spring, as will presently appear. In the present instance, the inner end of the spindle is supported in a bearing 25 in the casing, while the other end extends through an aperture 26 to the exterior of the casing, and is there provided with suitable means to adjust the tension of the spring, and lock the spindle against rotation. For this purpose, the casing is herein provided with a laterally extending boss 27, having formed thereon a series of ratchet teeth 28, coöperating in any appropriate manner with the spindle 17, adjustably to lock the same against rotation, as for example by providing the spindle with a laterally projecting pin 29, engaging one of the ratchet teeth. To facilitate the turning of the spindle, for the purpose of placing the spring under tension and varying its tension, the outer end of the spindle may be provided with a polygonal hole 30, to receive a suitable key (not shown), by means of which the spindle may be turned. This construction, moreover, provides a convenient means whereby the tension of the spring may be measured from the exterior of the casing, by simply securing to the outer end of the spindle a weighted arm indicated in dotted lines in Fig. 1. By this means, an inspector may instantly test the spring, without opening the valve casing, or disturbing any of its internal parts.

As a means for housing the outer end of the spindle and the ratchet, to prevent unauthorized persons from tampering with the same, and as a means for preventing gas from leaking through the spindle bearing to the outer air, I may provide a cap 31 threaded onto the boss 27, and I may provide a suitable compressible washer 32 of leather, fiber, or other appropriate material, placed under compression by screwing the cap onto the boss. By simply removing this cap, the spindle and ratchet are rendered accessible, and if desired, the spindle may be withdrawn from its place without disturbing the yoke. In order to facilitate the assembling of the working parts within the casing, the latter is provided with a threaded aperture 33, into which is screwed a cap 34. The aperture 33 is made sufficiently large to permit the introduction and assembling, or dismounting, of the interior parts. By removing the caps 31 and 34, the spindle 17 may be withdrawn, after which the spring 19 may be removed, without disturbing the yoke and valve.

The valve may be held normally in its open position against the tension of the spring by any suitable means located at any convenient point, either adjacent or at a considerable distance from the valve, but herein, the stem of the latter extends into an aperture 35, and is there held by a suitable heat-sensitive element 36, herein consisting of a ring, or plug, of fusible metal, which will melt at a low temperature, for example, 155 degrees F. An important feature of the invention resides in the fact that the fusible element is capable of supporting the valve and its yoke independently of the support afforded by the spindle, so that the latter may be removed, as before stated, without disturbing the valve and yoke. If desired, the stem 12 may be provided with a hole 37 drilled thereinto, for the purpose of rendering the fusible metal more sensitive to the presence of heat. If the valve is to be used for a liquid, it may be desirable to seal the under side of the fusible plug with some suitable neutral material, such as shellac, or other resinous substance, which will serve to prevent the liquid from interfering with the fusing of the metal.

It will now be apparent that, under normal conditions, the valve is held open by the fusible metal plug in the position shown in full lines in Fig. 2, and the flow of the gas or other fluid through the main is perfectly free and unrestricted. In case of fire, however, when the temperature rises to 155 degrees F., the fusible plug 36 melts, thus releasing the valve, and allowing the latter to close under the influence of the spring. By this means, the supply of gas to the building is automatically shut off, and the danger of explosions from that source is removed.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated forms or embodiments of the invention may be made without departing from the principles thereof.

Having thus described my invention, what I claim and desire by Letters Patent to procure is:—

1. A device of the class described comprising, in combination a casing having an inlet, an outlet, and a valve seat therebetween, a valve, a spring tending to move said valve toward said seat, means to guide and support said valve in its movement toward said seat, and a heat-sensitive element normally supporting and holding said valve away from its seat against the tension of said spring and independently of the support afforded by the guiding means.

2. A device of the class described comprising, in combination, a casing having an inlet, an outlet, and a valve seat therebetween, a valve, means tending to move said valve toward said seat, a heat-sensitive element normally holding said valve away from its seat, means to guide said valve, and means permitting said guiding means to be removed from its place without disturbing said valve.

3. A device of the class described comprising, in combination, a casing having an inlet, an outlet, and a valve seat therebetween, a valve, means tending to move said valve toward said seat, a heat-sensitive element normally holding said valve away from its seat, a spindle on which said valve is mounted to move toward and from said seat, and means permitting the removal of said spindle without disturbing said valve.

4. A device of the class described comprising, in combination, a casing having an inlet, an outlet, and a valve seat therebetween, a valve, a spring tending to move said valve toward said seat, a heat-sensitive element normally holding said valve away from said seat, a spindle on which said valve is mounted to move toward and from said seat, and means permitting the removal of said spindle and spring without disturbing said valve.

5. A device of the class described comprising, in combination, a casing having an inlet, an outlet and a valve seat therebetween, a valve, a spring tending to move said valve toward said seat, a heat-sensitive element normally holding said valve away from said seat, a spindle about which said spring is coiled and on which said valve is loosely mounted to move toward and away from said seat, and means to hold said spindle against rotation.

6. A device of the class described comprising, in combination, a casing having an inlet, an outlet and a valve seat therebetween, a valve, a spring tending to move said valve toward said seat, a heat-sensitive element normally holding said valve away from said seat, a spindle about which said spring is coiled and on which said valve is mounted to move toward and away from said seat, said spring being connected at its opposite ends to said valve and spindle, respectively, and means to hold said spindle against rotation.

7. A device of the class described comprising, in combination, a casing having an inlet, an outlet and a valve seat therebetween, a valve, a spring tending to move said valve toward said seat, a heat-sensitive element normally holding said valve away from said seat, a spindle about which said spring is coiled and on which said valve is mounted to move toward and away from said seat, said spring being connected at its opposite ends to said valve and spindle, respectively, and means permitting said spindle to be set in a plurality of positions of adjustment thereby to adjust said spring.

8. A device of the class described comprising, in combination, a casing having an inlet, an outlet, and a valve seat therebetween, a spindle mounted in said casing, a valve mounted to swing about said spindle, means normally to hold said valve away from said seat, a spring secured to said spindle and connected to said valve and tending to seat the same, and means to hold said spindle against rotation under the influence of said spring.

9. A device of the class described comprising, in combination, a casing having an inlet, an outlet, and a valve seat therebetween, a spindle mounted in said casing and extending at one end through the wall of said casing, a valve mounted to swing about said spindle, means normally to hold said valve away from said seat, a spring secured to said spindle and connected to said valve and tending to seat the same, and means at the outer end of said spindle to hold the same against rotation under the influence of said spring.

10. A device of the class described comprising, in combination, a casing having an inlet, an outlet, and a valve seat therebetween, a spindle mounted in said casing and extending at one end through the wall of said casing, a valve mounted to swing about said spindle, means normally to hold said valve away from said seat, a spring secured to said spindle and connected to said valve and tending to seat the same, and means including a ratchet at the outer end of said spindle to hold the same against rotation under the influence of said spring.

11. A device of the class described comprising, in combination, a casing having an inlet, an outlet, and a valve seat therebetween, a spindle mounted in said casing and extending at one end through said casing, an arm loosely mounted on said spindle, a valve carried by said arm, a spring coiled about said spindle and secured at one end to said arm and at the other end to said spindle, and means to secure said spindle against rotation under the influence of said spring.

12. A device of the class described comprising, in combination, a casing having an inlet, an outlet, and a valve seat therebetween, a spindle mounted in said casing and extending at one end through said casing, an arm loosely mounted on said spindle, a valve carried by said arm, a spring coiled about said spindle and secured at one end to said arm and at its other end to said spindle, means to secure said spindle against rotation under the influence of said spring, and a cap covering the outer end of said spindle.

13. A device of the class described comprising, in combination, a casing having an inlet, an outlet, and a valve seat therebetween, a spindle mounted in said casing and extending at one end through said casing, an arm loosely mounted on said spindle, a valve carried by said arm, means normally to hold said valve away from said seat, a spring tending to move said valve toward said seat, and a cap covering the outer end of said spindle.

14. A device of the class described comprising, in combination, a casing having an inlet, an outlet, and a valve seat therebetween, a spindle mounted in said casing and secured against rotation and extending at one end through said casing, an arm loosely mounted on said spindle and having knife-edge contact therewith, a valve carried by said arm, a spring tending to swing said arm about said spindle to close said valve, and means normally to hold said arm and thereby prevent said valve from moving toward said seat.

15. A device of the class described comprising, in combination, a valve casing having an inlet, an outlet, and a valve seat therebetween, a spindle mounted in said casing and extending at one end to the outside of said casing, said spindle being provided at its other end with a longitudinal groove, a yoke having two arms provided with collars encircling said spindle, a valve carried by said yoke, means normally to hold said valve away from said seat, a spring coiled about said spindle and having one end engaging said groove, and its other end engaging said yoke and tending normally to move said valve toward said seat, a pin secured to the outer end of said spindle, and a series of ratchet teeth on the valve casing one of which is engaged by said pin to hold said spindle against rotation in one direction.

16. A device of the class described comprising, in combination, a valve casing having an inlet, an outlet, and a valve seat therebetween, a spindle mounted in said casing and extending at one end to the outside of said casing, said spindle being provided at its other end with a longitudinal groove, a yoke having two arms provided with collars encircling said spindle, a valve carried by said yoke, means normally to hold said valve away from said seat, a spring coiled about said spindle and having one end engaging said groove, and its other end engaging said yoke and tending normally to move said valve toward said seat, a pin secured to the outer end of said spindle, a series of ratchet teeth on the valve casing one of which is engaged by said pin to hold said spindle against rotation in one direction, and a cap secured to said casing and inclosing said ratchet teeth, said pin, and the outer end of said spindle.

17. A device of the class described comprising, in combination, a valve casing having an inlet, an outlet, and a valve seat therebetween, a spindle mounted in said casing and extending at one end to the outside of said casing, said spindle being provided at its other end with a longitudinal groove, a yoke having two arms provided with collars encircling and having knife-edge engagement with said spindle, a valve carried by said yoke, means normally to hold said valve away from said seat, a spring coiled about said spindle and having one end engaging said groove, and its other end engaging said yoke and tending normally to move said valve toward said seat, a pin secured to the outer end of said spindle, and a series of ratchet teeth on the valve casing one of which is engaged by said pin to hold said spindle against rotation in one direction.

In testimony whereof, I have signed my name to this specification, in the presence of two subscribing witnesses.

JAMES F. MOYNIHAN.

Witnesses:
  LOUIS A. JONES,
  CLARA L. STUART.

---

Copies of this patent may be obtained for five cents each, by addressing the "Commissioner of Patents, Washington. D. C."